Oct. 26, 1937.    E. J. DE NORMANVILLE    2,097,021
VARIABLE SPEED EPICYCLIC GEARING
Filed May 26, 1936    2 Sheets-Sheet 1

E. J. de Normanville
Inventor

By: Glascock Downing & Seebold
Attys.

Oct. 26, 1937.  E. J. DE NORMANVILLE  2,097,021
VARIABLE SPEED EPICYCLIC GEARING
Filed May 26, 1936  2 Sheets-Sheet 2

Patented Oct. 26, 1937

2,097,021

UNITED STATES PATENT OFFICE 2,097,021

VARIABLE SPEED EPICYCLIC GEARING

Edgar Joseph de Normanville, Kingsbury, England, assignor of one-half to de Normanville Transmissions Limited, Coventry, England Application May 26, 1936, Serial No. 81,929
In Great Britain June 1, 1935

4 Claims. (Cl. 74—290)

This invention has for its object to provide an improved epicyclic mechanism suitable for use on motor vehicles and for other analogous uses.

The invention comprises the combination of driving and driven shafts, epicyclic gear elements interconnecting the shafts, a unidirectional clutch providing an alternative connection between the shafts, and means as hereinafter described for controlling the epicyclic gear elements.

In the accompanying sheets of explanatory drawings:—

In carrying the invention into effect as shown in the accompanying drawings, I employ a pair of coaxial shafts $a$, $b$ herein termed the driving and driven shafts. On the driving shaft is secured a carrier $c$ for the planet pinions $d$. These engage with a sun pinion $e$ which is freely mounted on a sleeve $f$ extending from the carrier $c$. They also engage an internally toothed orbit gear including an annulus $g$ on a member $h$ formed on the driven shaft $b$. Also between the planet carrier $c$ and the annulus $g$ there is arranged a one-way clutch. This latter comprises rollers $i$ co-operating with suitably shaped surfaces on the parts $c$, $h$. Relative movement of the members of the epicyclic mechanism may be prevented in any convenient manner. In the example illustrated I employ a slidable clutch member $k$ for connecting the annulus $g$ to the sun pinion $e$. This clutch member is also adapted to co-operate with a complementary part $l$ on the fixed casing $m$, for holding the sun pinion against rotation, the said member $k$ being slidably mounted and feather-keyed to a sleeve extending from one side of the sun pinion.

Figure 1:
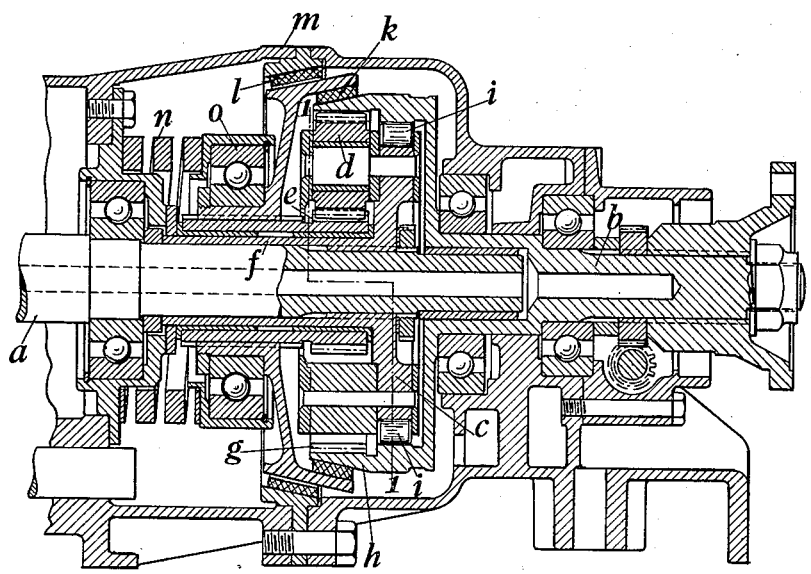
Figure 1 is a longitudinal section showing a mechanism constructed in accordance with the present invention.
Figure 2:
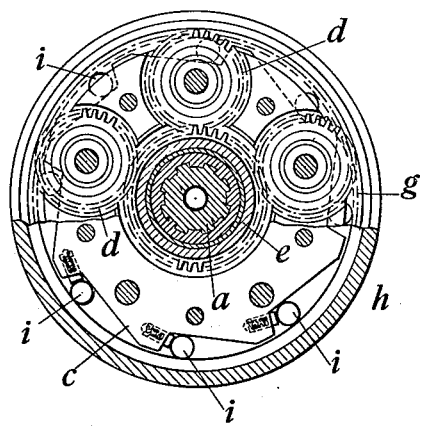
Figure 2 is a cross section on the line 1—1 Figure 1.
Figure 3:
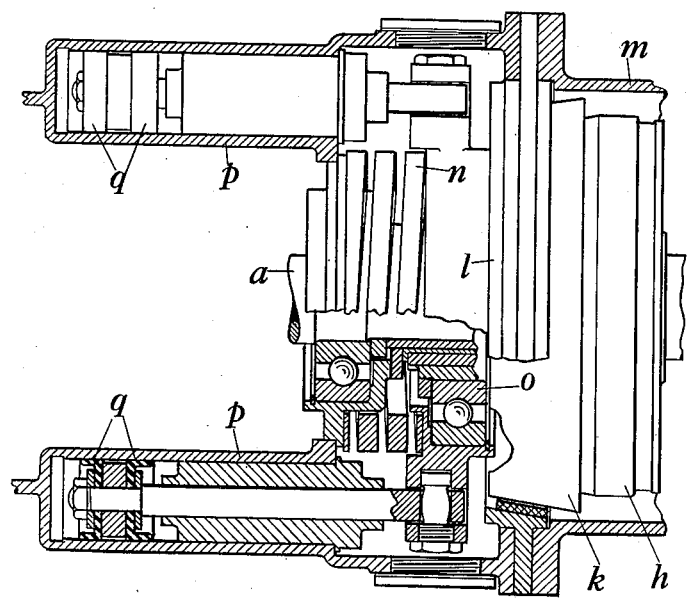
Figure 3 is a part sectional plan illustrating a fluid operated mechanism for actuating a clutch whereby the sun pinion can be secured either to the annulus of the epicyclic mechanism or to the fixed casing.

Any convenient means may be used for actuating the slidable member $k$. In the example illustrated, the said member is moved in the direction for engaging it with the annulus $g$ by a strong spring $n$, the latter acting through a ball bearing $o$. Movement in the other direction for releasing the member $k$ from the annulus $g$ or for engaging it with the casing $m$ is preferably effected by fluid operated means as shown in Figure 3. Such means comprise a pair of or any other convenient number of cylinders $p$ containing pistons $q$ connected to opposite sides of the bearing $o$. Fluid can be admitted to either side of the pistons under the control of any convenient valve (not shown) the fluid being supplied under pressure from a pump or a storage chamber. When fluid is admitted to the right hand sides of the pistons the member $k$ is released from the annulus $g$ and engaged with the casing $m$. For some purposes it may be required to supplement the action of the spring $n$ in holding the part $k$ in engagement with the annulus $g$. Pressure fluid is then admitted to the left hand sides of the pistons $q$.

The driving and driven shafts $a$, $b$ are rotated at equal speeds in the forward direction through the one-way clutch rollers $i$ which interconnect the planet carrier $c$ and the annulus $g$. At this time the clutch member $k$ also engages the annulus $g$, but the driving effort is transmitted from $a$ to $b$ by the one-way clutch rollers $i$. If the driven shaft $b$ temporarily becomes the driving shaft, as on a motor vehicle when the vehicle drives the engine, the driving effort is at once transmitted through the parts $g$, $k$, and the one-way clutch rollers $i$ are then inoperative. The parts $g$ and $k$ are so designed that their mutual frictional engagement is strong enough to transmit a reverse drive from the vehicle to the engine. But the normal drive from the engine to the vehicle is always transmitted through the one-way clutch rollers $i$.

When it is required to drive the driven shaft $b$ at a higher speed than the driving shaft $a$, the clutch member $k$ is engaged with the casing $m$ for holding the sun pinion $e$ stationary. Motion is then imparted to the driven shaft through the annulus, and again the one-way clutch rollers $i$ are inoperative.

When it is required to drive the mechanism backwards the sliding clutch member $k$ is engaged with the annulus $g$. As the clutch rollers $i$ cannot transmit a backward rotation to the driven shaft, the motion of the shaft $a$ is transmitted to the shaft $b$ through the parts $g$, $k$. If the frictional grip set up by the pressure of the spring $n$ is insufficient to transmit the reverse motion, the action of the spring is supplemented by the action of fluid pressure admitted to the left hand sides of the pistons $q$.

The mechanism above described is useful for a variety of purposes. Thus it may be employed on a motor vehicle and used either alone or as an auxiliary mechanism in front of or behind a gear box of either the sliding or epicyclic type.

Having thus described my invention what I claim as new and desire to secure by Letters Patent is:—

1. A variable speed epicyclic mechanism comprising the combination of driving and driven shafts, epicyclic gear elements interconnecting the shafts, a unidirectional clutch providing a connection between the shafts and enabling a direct drive to be transmitted from the driving shaft to the driven shaft, a clutch having a slidable member adapted to produce rotation of the epicyclic gear elements as one piece and thereby provide a supplemental connection between the driven and driving shafts when the unidirectional clutch is in action, and means for actuating the slidable member of the clutch, said means consisting in part of a spring for moving the said member in one direction, and fluid operated means for supplementing the action of the spring in retaining the said member in the position into which it is moved by the spring, and for moving the said member in the opposite direction against the action of the spring, substantially as described.

2. A variable speed transmission comprising in combination a casing, driving and driven shafts mounted in said casing, epicyclic gearing including sun, carrier and orbit gears, said orbit gear being provided with an extension forming an annulus interiorly thereof, a uni-directional clutch interconnecting the planet carrier and the annulus to enable a direct drive to be transmitted from the driving shaft to the driven shaft, a clutch associated with the sun gear adapted to be coupled to said orbit gear whereby the said epicyclic gearing may be rotated as a unit, and means for actuating the clutch.

3. The device as claimed in claim 2, including means whereby said clutch may be coupled to a fixed member of the casing to produce a different speed ratio.

4. A mechanism of the class described, comprising a casing, epicyclic gearing mounted in said casing, said epicyclic gearing comprising an orbit gear, a sun gear having an extension thereon, and planet gears, the planet gears being mounted on a carrier, a one-way clutch operatively interposed between said orbit gear and carrier, a clutch member slidably mounted on said extension, the said casing having a braking surface and the said orbit gear being provided with a complemental part of said clutch, the sliding clutch member being adapted to be slid into engagement with its said complemental part and also with said braking surface, whereby the epicyclic gearing may be rotated as a unit or at a different gear ratio, and means for actuating the slidable clutch member.

EDGAR JOSEPH DE NORMANVILLE.